United States Patent [19]
Ogata

[11] Patent Number: 6,074,748
[45] Date of Patent: Jun. 13, 2000

[54] MOLDED PRODUCT HAVING PHOTOCATALYTIC FUNCTION

[75] Inventor: Shiro Ogata, Kawasaki, Japan

[73] Assignee: Tao Inc., Tokyo, Japan

[21] Appl. No.: 08/945,662

[22] PCT Filed: Feb. 28, 1997

[86] PCT No.: PCT/JP97/00620

§ 371 Date: Oct. 31, 1997

§ 102(e) Date: Oct. 31, 1997

[87] PCT Pub. No.: WO97/32664

PCT Pub. Date: Sep. 12, 1997

[30] Foreign Application Priority Data

Mar. 4, 1996 [JP] Japan ......................... 8-70940

[51] Int. Cl.[7] ................. B32B 5/16; B32B 5/02; A61L 9/20
[52] U.S. Cl. ................. 428/357; 428/369; 428/372; 428/378; 428/379; 428/403; 422/121; 422/122; 250/504 R; 264/0.5; 264/21
[58] Field of Search ................. 422/5, 4, 121, 422/122; 250/455.11, 504 R; 252/644, 646; 264/0.5, 21; 428/369, 372, 375, 379, 403, 357, 378

[56] References Cited

U.S. PATENT DOCUMENTS 4,955,208  9/1990  Kawashima et al. ............ 422/122 X 5,564,065  10/1996  Fleck et al. ......................... 422/186.3

FOREIGN PATENT DOCUMENTS

| 62-66861 | 3/1987 | Japan . |
| 1-143630 | 6/1989 | Japan . |
| 3-106420 | 5/1991 | Japan . |
| 4-61933 | 2/1992 | Japan . |
| 4-17098 | 3/1992 | Japan . |
| 4-341787 | 11/1992 | Japan . |
| 6-320011 | 11/1994 | Japan . |
| 8-24666 | 1/1996 | Japan . |
| 8-266902 | 10/1996 | Japan . |
| 8-309122 | 11/1996 | Japan . |

*Primary Examiner*—Elizabeth McKane
*Attorney, Agent, or Firm*—Staas & Halsey LLP

[57] ABSTRACT

A molded article having a photocatalytic function, a desired shape, a large contact area, and being sufficiently irradiated with ultraviolet rays, even at an inner surface thereof. Unit particles such as glass beads, or filaments such as fibers, are bonded to one another into the desired shape. Subsequently, a photocatalytic functional layer is formed on a surface of each particle or fiber. Particles of a spontaneous emission ultraviolet radiating material or light storage-type ultraviolet radiating material may be mixed in the molded article.

34 Claims, 8 Drawing Sheets

MOLDED PRODUCT HAVING PHOTOCATALYTIC FUNCTION

TECHNICAL FIELD

The present invention relates to a molded article having a photocatalytic function and being effective in deodorization, sterilization and stain resistance.

BACKGROUND ART

Metal oxides such as titanium oxide ($TiO_2$) have a function of decomposing organic compounds which are in contact therewith or present close thereto by oxidization or reduction when excited by ultraviolet rays, and thus are called photocatalytic semiconductors.

This function is well known and is utilized in a variety of applications. For example, Unexamined Japanese Patent Publication No. 62-66861 discloses an arrangement in which a photocatalytic element having a photocatalytic semiconductor applied to the surface of its base, which is in the form of a film, bead, board or fibrous element, is placed in a glass tube and gas or liquid is circulated through the glass tube. Also, Unexamined Japanese Patent Publication No. 1-143630 discloses an arrangement in which gas or liquid is circulated through a photocatalytic element having a photocatalytic semiconductor applied to the surface of its base which is in the form of a lattice, plate, particle, pleat or net. Further, Unexamined Japanese Patent Publication No. 4-61933 discloses an arrangement in which a photocatalytic semiconductor is applied directly to a stainless steel pipe or a porous fine tube.

In the arrangement of the conventional photocatalytic elements, the photocatalytic semiconductor is applied to a surface of a base which is a member (tube or plate) having a predetermined shape suitable for its use. In such cases, it is difficult to make a functional area of the photocatalytic semiconductor much greater than the surface area of the base. Further, in order for the photocatalytic semiconductor to be applied to the surface of the base, usually the photocatalytic semiconductor in a sol state is applied to the surface of the base and then the base with the photocatalytic semiconductor applied thereto is baked at a predetermined temperature (50 to 500° C.). If, however, the base has a complicated shape, it may be difficult to make the photocatalytic semiconductor adhere to an inside surface of the base, or the base may be deformed due to heat. In addition, if the base is complicated in shape, it is difficult to irradiate its inside surface with ultraviolet rays.

SUMMARY OF INVENTION

An object of the present invention is to provide a molded article with a photocatalytic function capable of having a desired shape and a contact area much larger than an outside surface area thereof, and being sufficiently irradiated with ultraviolet rays even at an inner surface thereof, as needed.

According to one aspect of the present invention, a molded article is produced by gathering unit particles such as glass beads, bonding them one another to a desired shape as a whole, and then forming a photocatalytic functional layer on a surface of each particle.

The unit particles are filled and packed in a mold, and are heated while being lightly pressed due to their own weight and the like to thereby fusion-bond the unit particles to one another. Alternatively, the unit particles are bonded to one another by an adhesive. When bonding, the degree of pressure application and the temperature are set so that the particles maintain their shapes and intercommunicating gaps are formed among the particles. When using an adhesive, it is necessary to chose a suitable adhesive (e.g., water glass or low-melting glass frit) which will not affect properties of the unit particles and the photocatalytic semiconductor, and has an adequate durability in using the molded article as the photocatalytic element.

The molded article produced by gathering unit particles is characterized in capability of having a free shape, for example, blocks of various three-dimensional shapes, such as a tube, gutter, vessel and corrugated plate. Especially, it makes it possible to select shapes of components which have been physically or economically impractical to produce by conventional techniques and shapes suitable for use in various apparatuses. Furthermore, the molded article can have shapes, for example, of a natural thing such as a fish, animal or leaf.

The photocatalytic functional layer is formed, for example, by a process of dipping the molded article into a sol of optical semiconductor powder, and then drying and baking it. In this case, care should be taken so that the gaps in the molded article are not clogged with the optical semiconductor layer and that the molded article is not deformed, or the particles are not changed in property or decomposed in baking.

According to another aspect of the present invention, a molded article is produced by gathering and entangling unit filaments, such as glass-wool or glass fibers, forming the entangled filaments into a required overall shape by heating, and forming a photocatalytic functional layer on a surface of each filament.

For the material of the unit filaments, glass (soda-lime glass, borosilicate glass, silica glass, etc.) or synthetic resin (acrylic, polystyrene, polycarbonate, etc.) can be used. The unit filament may be in the form of a fibrous element, thread, fiber or string. However, the material used for the unit filaments needs to have at least a certain degree of transparency with respect to ultraviolet rays, and in the molded state, the unit filaments have a structure that randomly bent filaments have points of contact with one another and are fixed in place at their points of contact. The unit filaments are fixed to one another mainly by mutual friction and also by bonding.

The density of filaments in the molded article varies depending on uses, from a density equivalent to that of felt to a density equivalent to that of a coarse basket; in any case, gaps are formed among the filaments.

In the case where an ultraviolet ray can be substantially uniformly radiated to the entire molded article, metal (stainless steel, aluminum, tin, steel), wood, etc. can also be used.

The photocatalytic functional layer is formed by a process similar to that described above. In this case, care should be taken so that the gaps between the filaments will not be clogged with the optical semiconductor layer and that the molded article is not deformed, or the filaments are not disconnected or decomposed due to heat in baking.

Before molding, an aggregate of the unit particles or the unit filaments may be mixed with particles made of ultraviolet radiating material of a spontaneous emission type or a light storage type, or with particles obtained by mixing such an ultraviolet radiating material and glass or polymeric organic resin.

In the case where an aggregate of the unit particles or filaments is mixed with particles of a spontaneous emission-type luminous ceramic or a light storage-type luminous ceramic, or with particles obtained by mixing fine particles of such a ceramic and glass or polymeric organic resin, even after the radiation of ultraviolet rays onto the molded article is interrupted, the optical semiconductor of the molded article is continuously excited by ultraviolet rays radiated from the spontaneous emission-type luminous ceramic particles or radiated from the light storage-type luminous ceramic particles by consuming the energy stored therein, whereby the photocatalytic function is retained even thereafter. Moreover, the particles of a spontaneous emission-type luminous ceramic or light storage-type luminous ceramic normally emit visible lights of green, blue or orange, and therefore, the emitted visible light can be utilized for a decoration or guide light in the dark.

By adjusting the composition of the photocatalytic semiconductor (e.g., by adding an inorganic pigment or metal) or by controlling the heat treatment in the process of production, it is possible to shift the wavelength (absorption band) in the ultraviolet region necessary for obtaining the catalytic function. For example, if a small quantity of $CrO_3$ is added to $TiO_2$, the absorption band shifts toward the longer wavelength side. This permits the photocatalytic member to be matched with the emission spectrum characteristic of the spontaneous emission-type or light storage-type ultraviolet radiating material, whereby a photocatalytic semiconductor matching the wavelength of the ultraviolet radiation to be input thereto can be selected.

The photocatalytic semiconductor may be applied in advance only to surfaces of the unit particles; alternatively, a molded article may be produced from the unit particles mixed with the spontaneous emission-type or light storage-type luminous ceramic particles or from the unit particles containing the mixture of both so that the photocatalytic semiconductor is present over the entire surface of the molded article. In the former case, the photocatalytic semiconductor does not adhere to the surfaces of the spontaneous emission-type or light storage-type luminous ceramic particles or of the mixture particles, so that a larger quantity of ultraviolet radiation is emitted from these particles. Also, in the case where the light storage-type luminous ceramic particles are contained, they can absorb incoming ultraviolet rays with higher efficiency.

In the manufacturing process of the molded article, a photocatalytic function-assisting additive of metal may be added in order to accelerate and complement the photocatalytic reaction.

DESCRIPTION OF THE PREFERRED EMBODIMENTS

Figure 1:
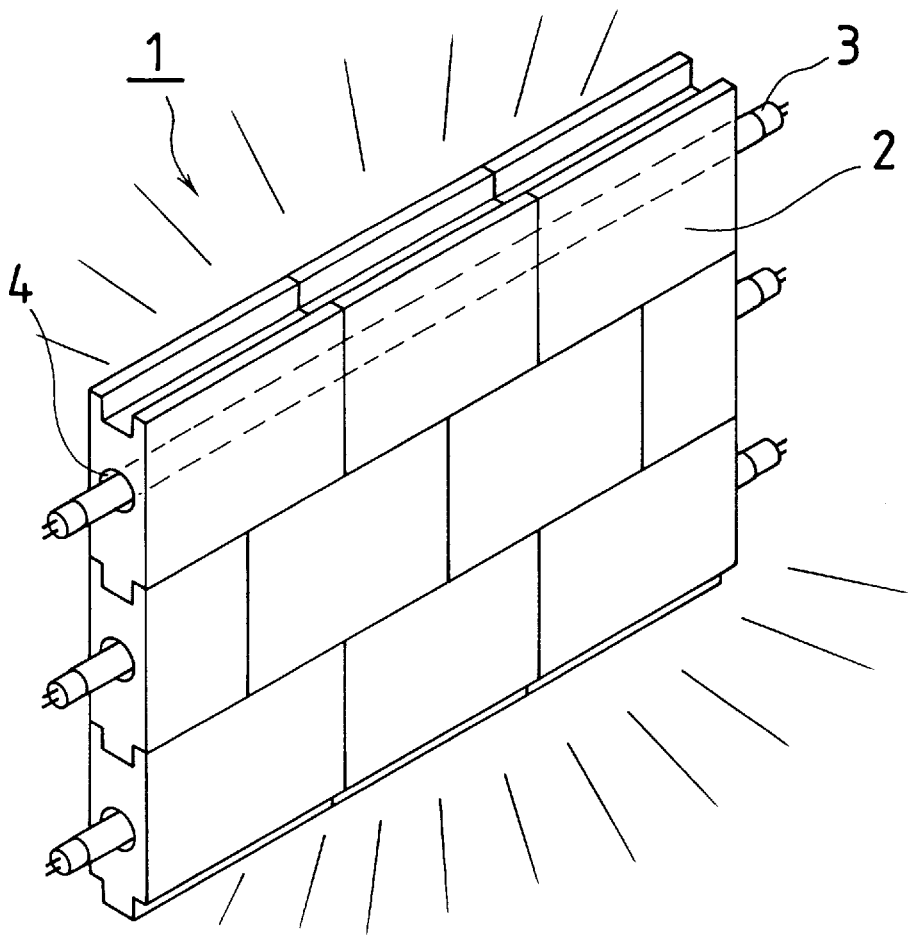
FIG. 1 is a perspective view showing a part of a wall using molded articles (blocks) according to the present invention.

A filter 1 shown in FIG. 1 is fitted in a partition wall between adjacent rooms and is used to allow air to flow therethrough to and from the adjacent rooms.

Figure 2:
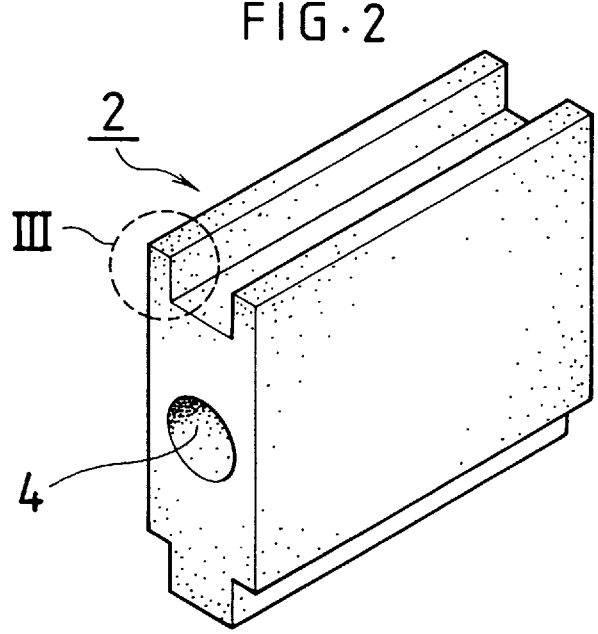
FIG. 2 is a perspective view of a molded article shown in FIG. 1.

The filter 1 is constituted by a plurality of light-transmitting, air-permeable blocks 2, shown in FIG. 2, laid one upon another.

Each whole block 2 is formed as a module so that a desired area can be covered by combining the blocks, and, in this embodiment, a fitting hole 4 for inserting a fluorescent tube 3 therethrough is formed in a central part of each block in the lateral direction. The fluorescent tube 3 is an external-excitation type ultraviolet radiating device and emits light by receiving energy from outside.

Figure 3:
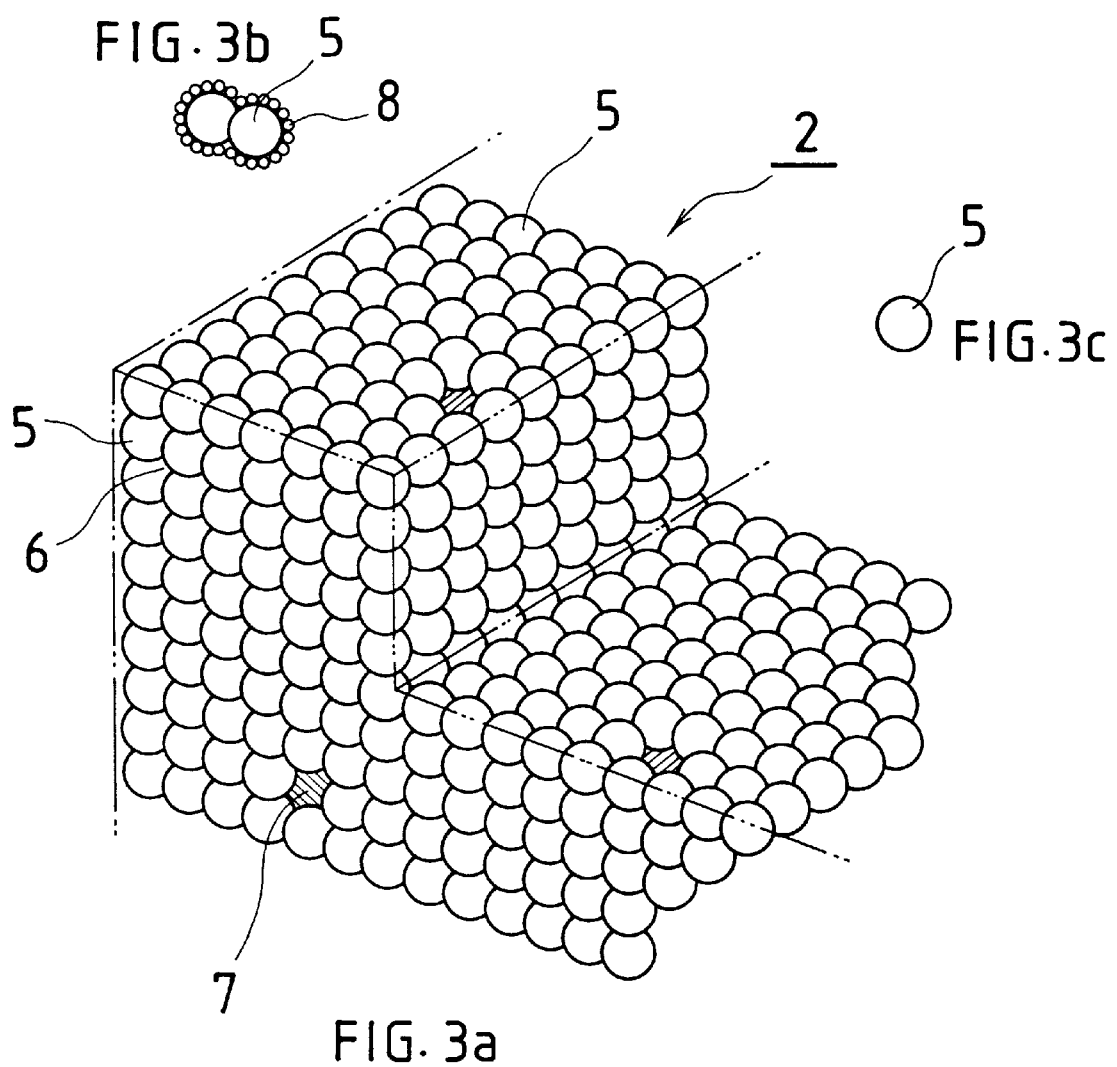
FIG. 3a is an enlarged perspective view of part III in FIG. 2.
FIG. 3b is a schematic diagram showing glass beads and optical semiconductor particles affixed thereto.
FIG. 3c is a diagram showing a glass bead as a unit particle.

In this embodiment, as shown in FIG. 3a, the block 2 is obtained by molding an aggregate of a large number of glass beads 5 (unit particles) into a desired block shape. Each glass bead 5 (FIG. 3c) is made of soda-lime glass having transparency to ultraviolet rays and a diameter of about 5 mm.

The glass beads 5 are filled in an unglazed mold for imparting a desired shape to a molded article, and are vibrated so that the beads 5 inside the mold are closely packed in the mold. Subsequently, the entire mold with the beads therein is placed in an electric furnace and is heated at 700° C. for 30 minutes with the electric current set at high level while the beads are slightly pressed downward by gravity, followed by natural cooling taking sufficient time. Owing to the heating, the individual beads 5 are bonded to one another at small spots close to points, so that the aggregate of the glass beads 5 as a whole is fixed in shape.

The heating temperature and time vary depending on the material and size of the beads and the shape of the block, and are adjusted to an extent that the individual beads 5 can be bonded to one another maintaining their spherical shape (particulate shape). Preferably, the heating temperature is about 650 to 720° C. for the unit particles of glass beads as in the case of this embodiment, about 450 to 800° C. for frit, and about 120 to 200° C. for polycarbonate resin. The molded article obtained in this way and constituted of an aggregate of the glass beads 5 has interconnecting gaps 6 among the beads 5, and, depending on location, may have relatively large spaces 7 due to lack of beads 5.

The material of the unit particles is not limited to glass and may be frit, polycarbonate resin or other material as long as the material used at least has a certain degree of transparency to ultraviolet rays. Also, the shape of the unit particles is not limited to a sphere as shown in FIG. 3c and may be polyhedron having surface irregularities, like crushed particles. The size of the unit particles depends on how the molded article is used; usually the unit particles used have an average diameter of about 20 μm to 10 mm. In the case where the molded article is designed to allow passage of gas therethrough as in this embodiment, the size of the unit particles may be small (20 μm to 1000 μm), but where the molded article is to pass liquid therethrough, the particle diameter must be increased to create larger gaps. Further, in the case where particles are spread over a slope and liquid is made to flow down the slopes each particle used may be as large as a ball, rather than a bead. Also, the unit particles may be hollow particles like glass balloons. As the glass beads, commercially available GB201M (commercial name: a product of Toshiba-Ballotini Co., Ltd., each bead having a particle diameter of 0.71 to 1.00 mm) can be used.

The molded aggregate of the glass beads 5 is in its entirety dipped into a sol prepared beforehand using "TO SOL" (a product of Tanaka Transfer Printing Co., Ltd.), shaken well so that the gaps 6 may not be clogged with the sol, and then dried at 45° C. for 10 hours. In this manner, the surfaces of the individual beads 5 constituting an intermediate molded article are coated with a photocatalytic semiconductor 8, and then the intermediate molded article is baked at 400° C. for 30 minutes, thereby fixing optical semiconductor particles (in this case, $TiO_2$) on the surfaces of the glass beads 5 (FIG. 3b) to form a photocatalytic functional layer (in this case, coating) thereon. The baking process is necessary for fixing $TiO_2$, but adequate care must be given to the baking temperature and duration so as not to cause deformation of the molded article or change in shape of the particles.

For the photocatalytic semiconductor, $TiO_2$, $ZnO$, $SrTiO_3$, $CdS$, $CdO$, $CaP$, $InP$, $In_2O_3$, $CaAs$, $BaTiO_3$, $K_2NbO_3$, $Fe_2O_3$, $Ta_2O_3$, $WO_3SaO_2Bi_2O_3$, $NiO$, $Cu_2O$, $SiC$, $SiO_2$, $MoS_2$, $MoS_3$, $InPb$, $RuO_2$ $CeO_2$ etc. can be used.

$TiO_2$ in the form of sol is commercially available as "STS-20" (commercial name: a product of Ishihara Sangyo Kaisha, Ltd.), "TO SOL" and "PTO SOL" (commercial names: products of Tanaka Transfer Printing Co., Ltd.). The particle diameter of $TiO_2$ in these sols is 0.01 to 0.07 μm. The wavelength of ultraviolet rays for exciting these particles is varied depending on the kind of particle.

As an additive for providing a complementary function such as mildew resistance and sterilization, Pt, Ag, $RuO_2$, Nb, Cu, SnNiO, etc. may be used.

The completed block 2 (molded article having a photocatalytic function) has a translucent white color, a large number of communicating holes interconnecting the gaps 6, and a total surface area which is three to four times as large as the surface area of a solid block.

The blocks 2 are laid up one upon another, as shown in FIG. 1, to form the filter 1 constituting part of the wall. Opening and closing of the door or movement of a person causes the air in the spaces on the opposite sides of the filter 1 to flow in either direction through a large number of gaps 6. In this case, if the surfaces of the filter 1 are being irradiated with ultraviolet rays from fluorescent lamps (external-excitation type ultraviolet radiating devices) etc. in the room, then the photocatalytic functional layers of the blocks 2 are activated, so that organic compounds in the air which come into contact with the layers are decomposed (oxidized or reduced) for deodorization and removal of harmful floating organic matter, thereby producing sterilizing effect too.

In the case where the blocks 2 are thick or the space on one side of the filter is dark, fluorescent tubes 3 are inserted through the fitting holes 4 of the blocks 2 and are lit. By doing so, the wall surfaces of the filter 1 can be made luminous to illuminate the interior of the room, and the blocks 2 are irradiated with ultraviolet rays from inside, so that the photocatalytic functional layers are activated to a high level. As a result, the deodorizing function and the sterilizing function are enhanced.

The intermediate molded article, which is a mere aggregate of the glass beads 5, has a considerable degree of transparency to ultraviolet rays, but the photocatalytic semiconductor is translucent and absorbs ultraviolet rays at its surface, so that ultraviolet rays radiated on the surface of the molded article (final product) having the photocatalytic functional layer formed thereon tends to fail to reach the interior or inside surface of the molded article. In such a case, it is extremely effective to provide external-excitation type ultraviolet radiating devices such as fluorescent tubes inside the blocks 2 to enhance the photocatalytic function of the blocks 2.

The fluorescent tubes 3 may be replaced with other external-excitation type ultraviolet radiating devices such as mercury lamps, xenon lamps, black-light lamps or halogen lamps.

The filter 1 may also be used as an outlet filter for a duct which introduces air into an underground passage.

Figure 4:
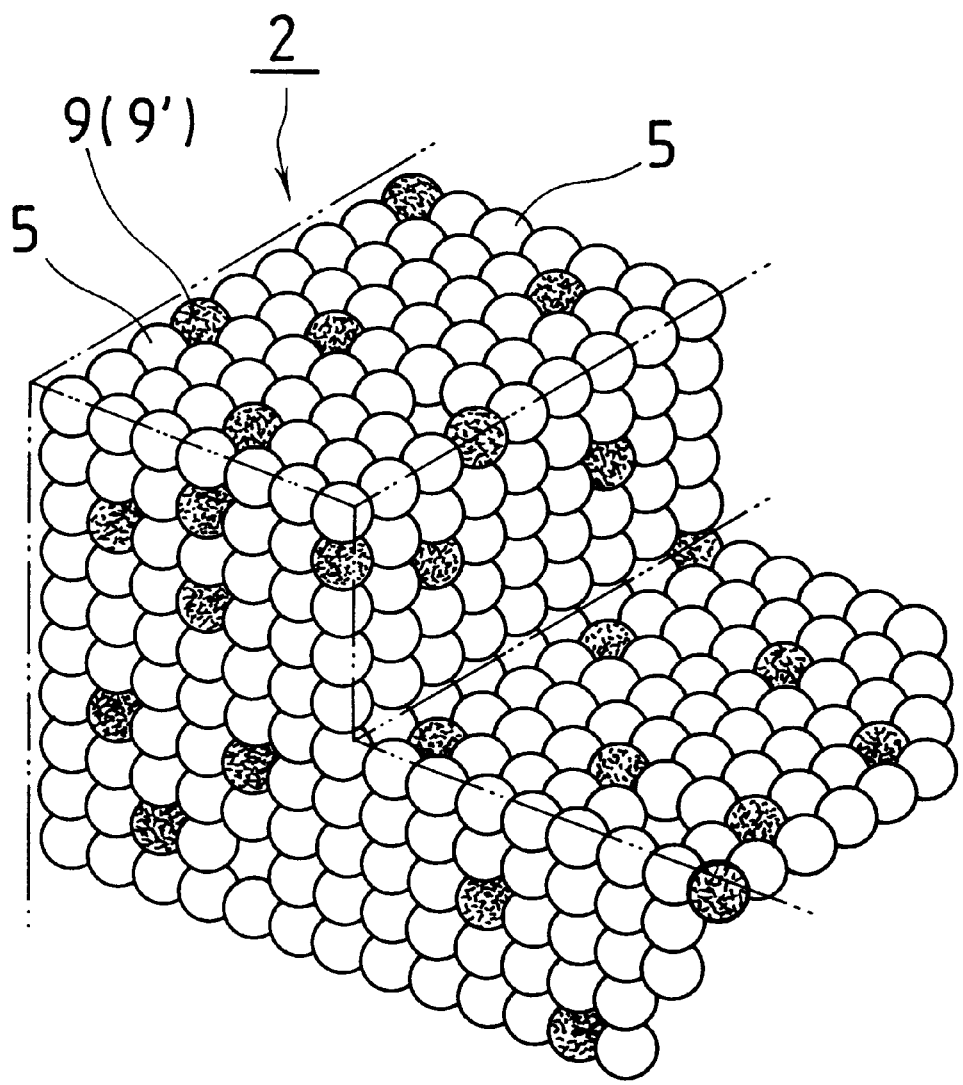
FIG. 4 is an enlarged view of a molded article obtained by molding a mixture of glass beads and particles made of an ultraviolet radiating material into shape.

The block 2 shown in FIG. 1 may alternatively be obtained as follows: After the photocatalytic functional layer is formed beforehand on the surface of each glass bead 5 (unit particle made of an ultraviolet ray-transmitting material), the glass beads 5 having the photocatalytic functional layer formed thereon and particles 9 made of a light storage-type ultraviolet radiating material are mixed together to obtain an aggregate of a given shape, as shown in FIG. 4, and the particles 5 and 9 are bonded to one another in a manner such that their particulate shapes are maintained. For the light storage-type ultraviolet radiating material, the light-storage-type luminous ceramic "LUMINOVA" (a product of Nemoto & Company Ltd.) may be used. Alternatively, fine particles obtained by crushing the light storage-type luminous ceramic may be mixed with glass or polymeric organic resin and the mixture may be formed into beads (mixture particles 9') having a particle diameter equivalent to that of the beads 5. As the photocatalytic semiconductor, the aforementioned "TO SOL" (a product of Tanaka Transfer Printing Co., Ltd.) may be used, and the molded article can be obtained by a molding process similar to that described above.

Although the photocatalytic functional layer is formed beforehand on the surface of each glass bead 5, the surfaces of the glass beads come into contact with one another and are bonded together during heating, and thus the light storage-type luminous ceramic particles 9 or the mixture particles 9' can be considered to be caught in position by the surrounding glass beads 5.

A spontaneous emission-type ultraviolet radiating material (spontaneous emission-type luminous ceramic) is a material that consumes its internal energy to emit light by itself and utilizes radioactive decay of radium or promethium, and the emitted light includes an ultraviolet region. Presently, a lump obtained by solidifying refined powder of rocks containing such a material is again crushed and the thus-obtained crushed particles are used.

The light storage-type ultraviolet radiating material (light storage-type luminous ceramic) is a material that obtains energy from outside and emits light by releasing the energy, and the emitted light includes an ultraviolet region. As such a material, "LUMINOVA" (commercial name: a product of Nemoto & Company Ltd.) and "KEPRUS" (commercial name: a product of Next Eye Co., Ltd.) are commercially available. Each of these products contains strontium aluminate ($SrAl_2O_4$) as a main component, and other components such as high-purity alumina, strontium carbonate, europium, dysprosium, etc. The peak point in the absorption spectrum is at 360 nm, and the particle diameter is 20 to 50 $\mu$m. The crushed particles, before undergoing a fine crushing process may be directly used.

Some of the commercially available products tend to deteriorate largely by absorbing moisture; therefore, they may be mixed with glass or a transparent polymeric organic resin such as polycarbonate prior to actual use.

The block obtained is used in the same manner as in the aforementioned example. In this case, however, even after the fluorescent tubes 3 are turned off, ultraviolet rays are continuously radiated from the light storage-type luminous ceramic particles 9 or the mixture particles 9', which have been irradiated with ultraviolet rays until then to store the ultraviolet radiate energy, whereby the surrounding photocatalytic functional layer is activated and the catalytic function is retained. Therefore, even in the nighttime during which no person is present in the room, deodorization and sterilization effects continue, making it possible to prevent uncomfortable odor from remaining in the room.

A similar molded article can be obtained also by a process in which, first, the glass beads 5 and the light storage-type luminous ceramic particles 9 or the mixture particles 9' are heated and bonded to one another to be molded into shape, and the entire molded article is dipped into a sol of photocatalytic semiconductor, dried, and then baked. According to this process, however, the irradiation efficiency with which the light storage-type luminous ceramic particles 9 or the mixture particles 9' are irradiated with ultraviolet rays and the radiant efficiency with which the particles 9 or 9' radiate ultraviolet rays therefrom are negatively affected by the photocatalytic functional layer adhering to the surfaces of the particles 9 or 9'.

Figure 5:
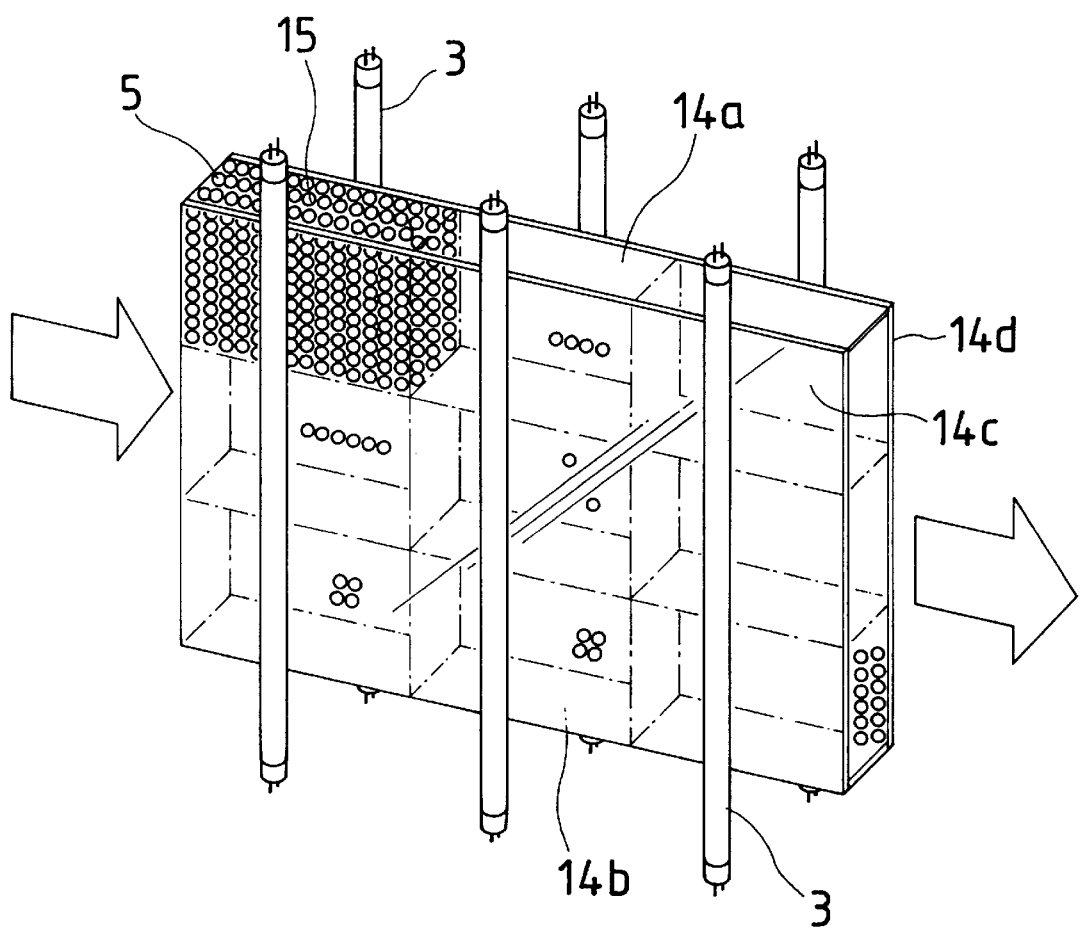
FIG. 5 is a perspective view of a fluid purifying device using the molded articles according to the present invention.

FIG. 5 shows a fluid purifying device wherein a plurality of filter blocks 15 is arranged in a passage constituted of top, bottom, left and right glass plates 14a to 14d.

Each of the filter blocks 15 is obtained by molding glass beads 5, each having a photocatalytic functional layer (in this example, $TiO_2$ coating) formed on its surface, into the shape of rectangular parallelepiped. Three fluorescent tubes 3 are arranged along each of the left and right glass plates 14c and 14d, and with these fluorescent tubes lit, gas or liquid is made to pass from the front side to the rear side. The gas or liquid, when coming into contact with the photocatalytic functional layer while passing through the filter blocks 15, undergoes deodorization, decomposition of noxious matter, sterilization, etc.

The performance of this type of filter declines after long use due to accumulation of decomposed matter on the filter blocks, thus requiring regular washing. In washing, the filter blocks (molded articles) of this example, each obtained by bonding and molding the unit particles having a filtering function into shape, can individually and easily be detached one another and washed like a unit. In addition, since the small beads 5 need not be separated, maintenance of the purifying device can be done with ease even when it is of a large size.

Figure 6A:
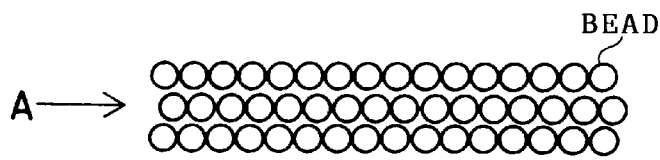
FIG. 6a illustrates an example of the structure of a photocatalytic member according to the present invention.
Figure 6B:
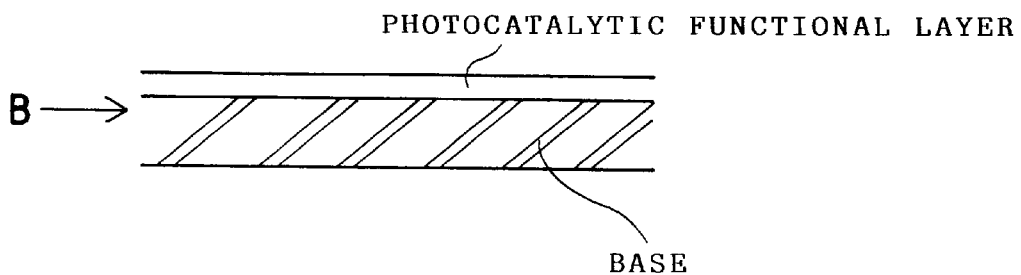
FIG. 6b illustrates an example of the structure of a conventional photocatalytic member.

The capacity of the filter of FIG. 1 or of the fluid purifying device of FIG. 5 to decompose organic compounds is much higher than conventional photocatalytic members, since the total surface area of the photocatalytic functional layer is larger. This will be explained with reference to the results of experiments performed using photocatalytic members shown in FIGS. 6a and 6b.

Photocatalytic Member A (Glass Beads-Molded Article According to the Present Invention)

Glass beads: GB604M (a product of Toshiba-Ballotini Co., Ltd.); particle diameter: 4.0 mm on average.

Molding: The glass beads were put in a bowl-shaped unglazed vessel, then heated in an atmosphere of 700° C. for 30 minutes, and cooled. The molded article thus obtained has an overall shape whose spherical portions are cut flat by a plane. Each flat portion has a diameter of 130 mm, and its central part has a thickness of 15 mm. The total surface area of a solid article of the same size is 320 $cm^2$. The glass beads were arranged in the form of pyramid (FIG. 6), the total surface area is 199 $cm^3$×2.22/0.4=1104.45 $cm^2$, and the void volume is 199 $cm^3$×25.95%=51.64 $cm^3$.

Photocatalytic semiconductor: STS-21 (a product of Ishihara Sangyo Kaisha, Ltd.; neutral sol of $TiO_2$; particle diameter: 0.07 $\mu$m) is used in the form of a solution containing 20 wt % of the photocatalytic semiconductor. The glass beads were dipped in this solution for coating, dried, and then baked at 400° C. for 30 minutes. The coating formed on the surfaces of the beads has a thickness of 2 to 3 $\mu$m.

Photocatalytic Member B (Conventional Article Having a Base Applied with Photocatalytic Semiconductor):

Base: Decorative plate "KERAMIT" (commercial name: a product of Clayburn Ceramics Co., Ltd.; 150 mm×220 mm×4 mm (thickness)), functional surface area: 330 $cm^2$.

Photocatalytic semiconductor: STS-21: Under the same conditions as the above case, a solution of the photocatalytic semiconductor was prepared, and the decorative plate was dipped in the solution, dried and baked. The thickness of the coating was 2 to 3 $\mu$m.

Figure 7:
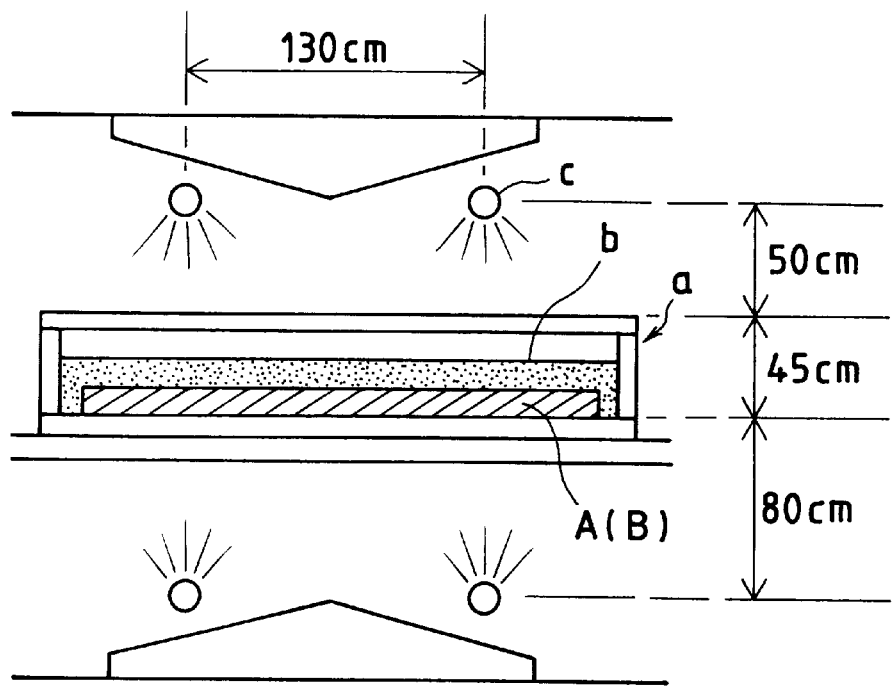
FIG. 7 is a schematic diagram of an experimental device.

Experimental Device (FIG. 7)

Two vessels, a, (330 mm×330 mm×40 mm) made of float glass 5 mm thick were prepared, the photocatalytic member A was put in one vessel and the photocatalytic member B in the other. Equal quantities of colored water b, being colored by a solution containing 0.049% of POLLUX BLUE PM-B (commercial name: a product of Sumika Color Co., Ltd.), were poured into the respective vessels until the photocatalytic members A and B were completely submerged, and the vessels were covered with float glass. The colored water had a pH of 5.5 to 6.5. When the colored water was poured into the vessels a, the liquid temperature was 13° C. and the room temperature was 20° C. Two black-light lamps c (40 W) were arranged about 50 cm above the vessels, and two similar black-light lamps were arranged about 80 cm below the vessels.

POLLUX BLUE PM-B has the composition of Phthalocyanine Blue/polyoxyalkylene alkylarylether/organic nitrogen-based antiseptic agent/silicon-based antifoaming agent and is nonionic, and the coloring component is decomposed not by ultraviolet radiation but solely by organic decomposition.

Results of Experiments

The black-light lamps c were lit, and change in color of the colored water b was observed at intervals of 30 minutes. As a result, in both of the photocatalytic members A and B, the color apparently became lighter and lighter with the passage of time to an extent that a dark-blue sediment was observed in the vessels a. However, it took 12 hours and 30 minutes for the photocatalytic member A and 61 hours and 30 minutes for the photocatalytic member B until almost all coloring component is deposited to make the colored water nearly transparent. Thus, it was found that the photocatalytic member A had a decomposition capacity about five times as high as that of the photocatalytic member B.

Figure 8:
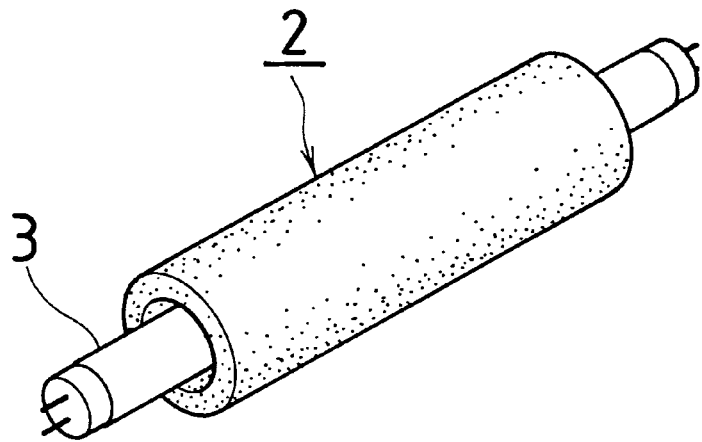
FIG. 8 is a perspective view showing an example of the molded article of the present invention formed into a tubular shape.
Figure 9:
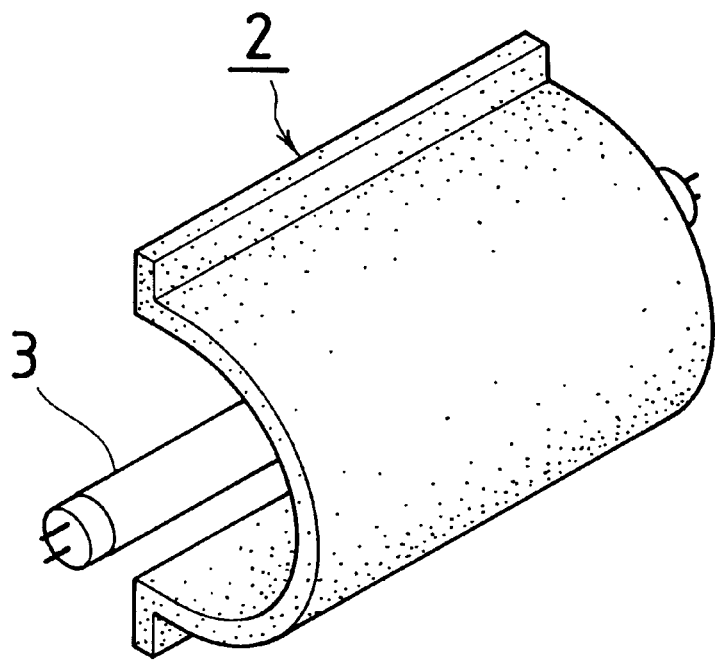
FIG. 9 is a perspective view showing another example of the molded article of the present invention formed into a semicylindrical shape.

FIGS. 8 and 9 show molded articles formed into tubular and cover-shaped blocks 2, respectively, according to the present invention for use with lighting apparatus. The photocatalytic functional layers of the covers are activated by ultraviolet rays emitted from the fluorescent tubes 3 arranged inside the covers, and air flow passing through the gaps 6 of the covers is produced by the light emitted from the fluorescent tubes 3, thus providing a deodorizing/sterilizing function. Compared with ordinary covers, the photocatalytic functional layers of these covers have a much larger surface area, thus providing an enhanced photocatalytic function. Also, the covers having intricate shape can be formed relatively easily as needed.

Figure 10:
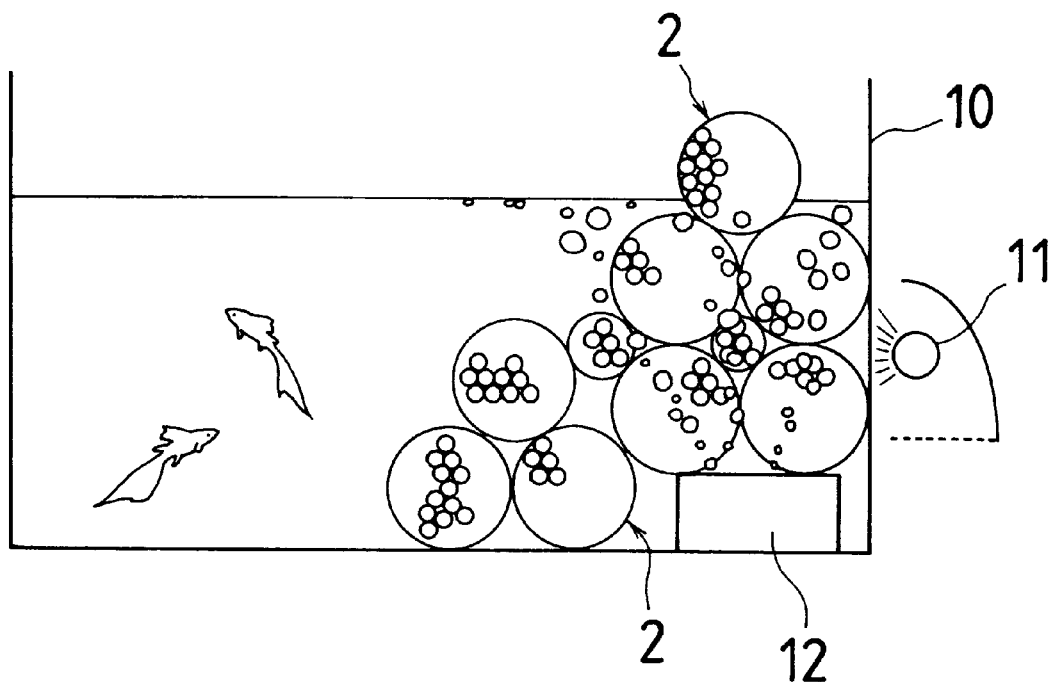
FIG. 10 is a perspective view showing still another example of the molded article of the present invention formed into a ball shape (showing an example of how the molded article is used)
Figure 11:
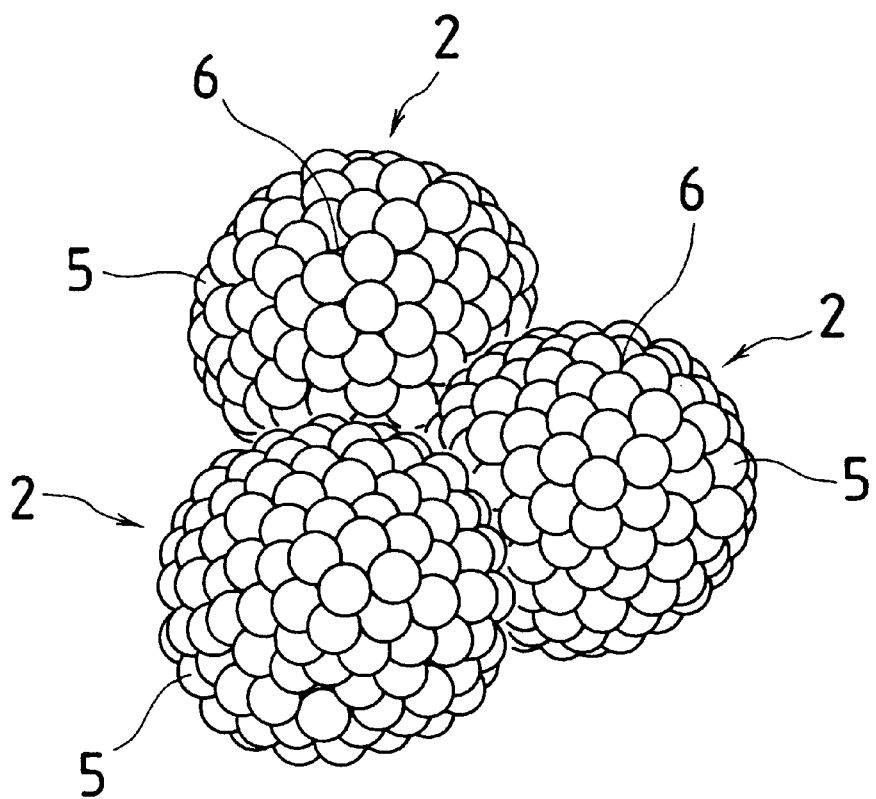
FIG. 11 is an enlarged view of ball-shaped molded articles shown in FIG. 10.

FIGS. 10 and 11 show molded articles formed into ball-shaped blocks 2 according to the present invention. These blocks are put into a water tank 10 for keeping fish etc., for example, and are irradiated with ultraviolet rays from an ultraviolet radiating device 11 arranged outside. Each of the ball-shaped blocks 2 has a large number of interconnecting gaps 6 to allow air bubbles and water flow produced by a filtering device 12 to pass through the interior of each block 2, thereby decomposing harmful organic compounds (waster matter) in the water. These blocks are low in water flow resistance and easy to handle at the time of washing, compared with an ordinary device consisting of particles of an ion exchange resin merely filled in a tube. In addition, there is no particular restriction on the location where the blocks are to be arranged.

Figure 12:
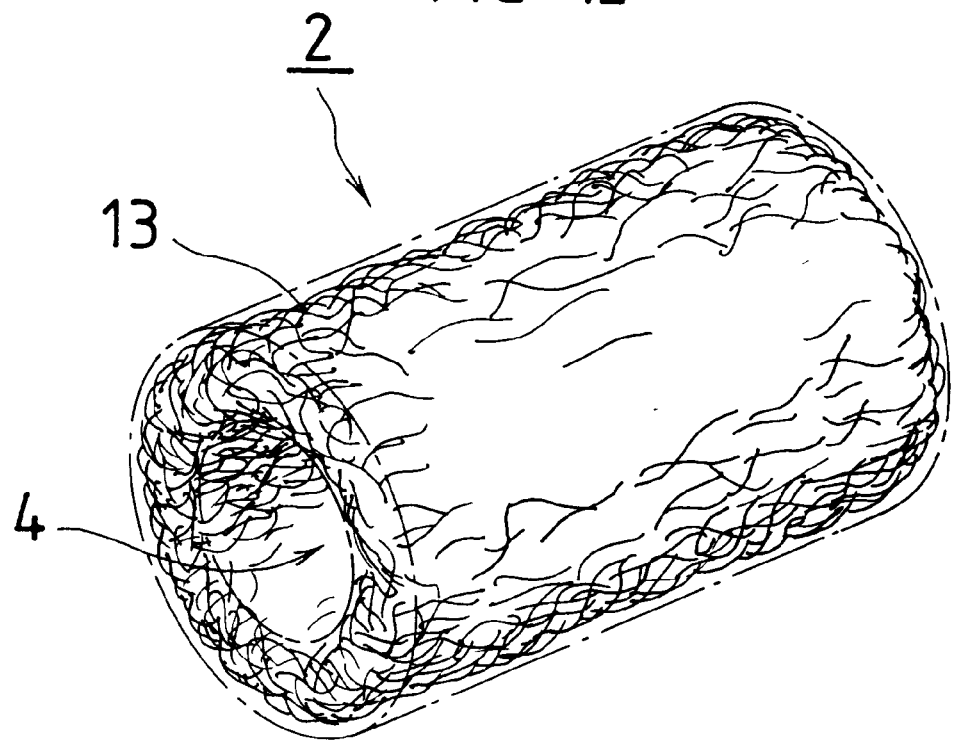
FIG. 12 is a perspective view of a molded article formed using unit filaments.

FIG. 12 shows a block 2 which is obtained by randomly entangling glass fibers 13 (unit filaments made of an ultraviolet ray-transmitting material) having an average diameter of 100 μm in cross section and by forming the entangled fibers into a cylindrical shape in a manner such that gaps are present among the fibers 13. When the fibers 13 are molded into shape with heat applied thereto, the fibers at the surface are fixed into shape due to heat while the inner entangled fibers are frictionally fixed in place at their points of contact with one another. Therefore, the overall shape of the molded article is never deformed. The intermediate molded article obtained in this manner is dipped into the "TO SOL" (a product of Tanaka Transfer Printing Co., Ltd.), then dried, and again put in a mold for baking so as to prevent deformation of the shape. Thus, the molded article having a photocatalytic functional layer formed on the surface of each filament is finally obtained. This block can be molded into a relatively free form, as in the aforementioned example using the beads 5. Also, by using glass fibers with different diameters, it is possible to obtain a variety of blocks suited for diverse uses.

As the material of the unit filaments, glass (soda-lime glass, borosilicate glass, silica glass, etc.) or synthetic resin (acrylic resin, polystyrene, polycarbonate, etc.) may be used.

The block 2 has a hole 4 formed in its central part in the lateral direction, and this hole 4 can be used as a fitting hole for inserting therethrough a fluorescent tube serving as an external-excitation type ultraviolet radiating device which emits light by receiving energy from outside.

Figure 13:
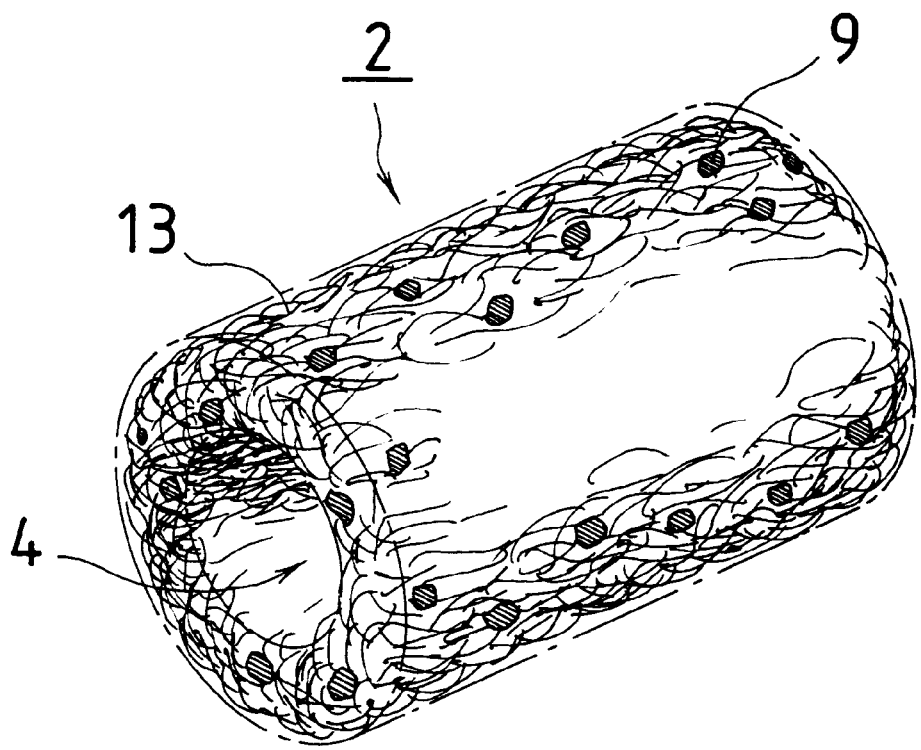
FIG. 13 is a perspective view of a molded article formed using a mixture of unit filaments and particles made of an ultraviolet radiating material.

FIG. 13 shows a molded article similar to that shown in FIG. 12, but the former includes the light storage-type luminous ceramic particles 9 or the aforementioned mixture particles 9'. This molded article may be obtained by first mixing the glass fibers 13 with the light storage-type luminous ceramic particles 9 or the mixture particles 9', then molding the fibers with the particles into shape with heat applied thereto, and dipping the entire molded block into a sol of an optical semiconductor. Alternatively, the light storage-type luminous ceramic particles 9 or the mixture particles 9' may be allowed to be caught in the molded article shown in FIG. 12, and then the molded article with the particles may be baked again moderately so that the particles can be fixed and will not be separated from the block.

Like the example shown in FIG. 12, the block 2 has a hole 4 formed in its central part in the lateral direction, and this hole 4 can be used as a fitting hole for inserting therethrough a fluorescent tube serving as an external-excitation type ultraviolet radiating device which emits light by receiving energy from outside.

In the manufacturing process of the aforementioned molded articles, metal (Pt, Ag, Rh, $RuO_2$, Nb, Cu, Sn, NiO, etc.) may be added as a photocatalytic function-assisting additive for accelerating and complementing the photocatalytic reaction.

The molded article according to the present invention is constituted of an aggregate of unit particles or unit filaments, and accordingly, a molded article having a photocatalytic function can be shaped into a relatively free form. Thus, surface area of the molded article, that is, the area of the photocatalytic functional layer, can be made much greater than a conventional one, thus providing an enhanced photocatalytic effect. Where an external-excitation type ultraviolet radiating device is arranged inside the molded article, the large surface area of the photocatalytic functional layer not only can be utilized more effectively but also a higher photocatalytic function not only can be obtained.

What is claimed is:

1. A molded article having a photocatalytic function, produced by the process comprising the steps of:
    gathering unit particles made of an ultraviolet ray-transmitting material;
    forming said unit particles into a desired shape by bonding said unit particles to one another so that each of said unit particles maintains a particulate shape; and
    forming a photocatalytic functional layer on the surface of each of said unit particles.

2. A molded article having a photocatalytic function according to claim 1, wherein said molded article has a hole for inserting therethrough an ultraviolet radiating device for emitting light by receiving energy from outside.

3. A molded article having a photocatalytic function according to claim 1, wherein a photocatalytic function-assisting additive of metal is added to said molded article.

4. A molded article having a photocatalytic function, produced by the process comprising the steps of:
    mixing and gathering unit particles each made of an ultraviolet ray-transmitting material and having a photocatalytic functional layer on a surface thereof, and particles made of an ultraviolet radiating material; and
    forming the mixture of said particles into a desired shape by bonding said particles to one another so that each of said unit particles maintains a particulate shape.

5. A molded article having a photocatalytic function according to claim 4, wherein said ultraviolet radiating material comprises a material that emits light by consuming an internal energy thereof.

6. A molded article having a photocatalytic function according to claim 4, wherein said ultraviolet radiating material comprises a material that emits light by releasing energy obtained from outside.

7. A molded article having a photocatalytic function according to claim 4, wherein said ultraviolet radiating material comprises particles obtained by mixing a material that emits light by consuming an internal energy thereof into one of glass and polymeric organic resin.

8. A molded article having a photocatalytic function according to claim 4, wherein said ultraviolet radiating material comprises particles obtained by mixing a material that emits light by releasing energy obtained from outside into one of glass and polymeric organic resin.

9. A molded article having a photocatalytic function according to claim 4, wherein said molded article includes a hole for inserting therethrough an ultraviolet radiating device for emitting light by receiving energy from outside.

10. A molded article having a photocatalytic function according to claim 4, wherein a photocatalytic function-assisting additive of metal is added to said molded article.

11. A molded article having a photocatalytic function, produced by the process comprising the steps of:
gathering and mixing unit particles made of an ultraviolet ray-transmitting material and particles made of an ultraviolet radiating material;
forming the mixture of said particles into a desired shape by bonding said particles to one another so that each of said particles maintains a particulate shape; and
forming a photocatalytic functional layer on a surface of each of said particles.

12. A molded article having a photocatalytic function according to claim 11, wherein said ultraviolet radiating material comprises a material that emits light by consuming an internal energy thereof.

13. A molded article having a photocatalytic function according to claim 11, wherein said ultraviolet radiating material comprises a material that emits light by releasing energy obtained from outside.

14. A molded article having a photocatalytic function according to claim 11, wherein said ultraviolet radiating material comprises particles obtained by mixing a material that emits light by consuming an internal energy thereof into one of glass and polymeric organic resin.

15. A molded article having a photocatalytic function according to claim 11, wherein said ultraviolet radiating material comprises particles obtained by mixing a material that emits light by releasing energy obtained from outside into one of glass and polymeric organic resin.

16. A molded article having a photocatalytic function according to claim 11, wherein said molded article includes a hole for inserting therethrough an ultraviolet radiating device for emitting light by receiving energy from outside.

17. A molded article having a photocatalytic function according to claim 11, wherein a photocatalytic function-assisting additive of metal is added to said molded article.

18. A molded article having a photocatalytic function, produced by the process comprising the steps of:
gathering and entangling filaments made of an ultraviolet ray transmitting material with gaps among the filaments;
forming the entangled filaments into a desired shape by fixing the filaments to one another at points of contact therebetween;
incorporating an ultraviolet radiating material in the entangled filaments; and
forming a photocatalytic functional layer on a surface of each of said filaments.

19. A molded article having a photocatalytic function according to claim 18, wherein said molded article includes a hole for inserting therethrough an ultraviolet radiating device for emitting light by receiving energy from outside.

20. A molded article having a photocatalytic function, produced by the process comprising the steps of:
gathering and entangling filaments made of an ultraviolet ray transmitting material with gaps among the filaments;
forming the entangled filaments into a desired shape by fixing the filaments to one another at points of contact therebetween;
forming a photocatalytic functional layer on a surface of each of said filaments; and
retaining particles made of an ultraviolet radiating material in a part of said gaps among the filaments.

21. A molded article having a photocatalytic function according to claim 20, wherein said ultraviolet radiating material comprises a material that emits light by consuming an internal energy thereof.

22. A molded article having a photocatalytic function according to claim 20, wherein said ultraviolet radiating material comprises a material that emits light by releasing energy obtained from outside.

23. A molded article having a photocatalytic function according to claim 20, wherein said ultraviolet radiating material comprises particles obtained by mixing a material that emits light by consuming an internal energy thereof into one of glass and polymeric organic resin.

24. A molded article having a photocatalytic function according to claim 20, wherein said ultraviolet radiating material comprises particles obtained by mixing a material that emits light by releasing energy obtained from outside into one of glass and polymeric organic resin.

25. A molded article having a photocatalytic function according to claim 20, wherein said molded article includes a hole for inserting therethrough an ultraviolet radiating device for emitting light by receiving energy from outside.

26. A molded article having a photocatalytic function according to claim 20, wherein a photocatalytic function-assisting additive of metal is added to said molded article.

27. A molded article having a photocatalytic function, said method produced by the process comprising the steps of:
gathering and entangling filaments made of an ultraviolet ray transmitting material with gaps among the filaments;
retaining particles made of an ultraviolet radiating material in a part of said gaps among the filaments;
forming the entangled filaments into a desired shape by fixing the filaments to one another at points of contact therebetween; and
forming a photocatalytic functional layer on surfaces of each of said filaments and said particles made of the ultraviolet radiating material.

28. A molded article having a photocatalytic function according to claim 27, wherein said ultraviolet radiating material comprises a material that emits light by consuming an internal energy thereof.

29. A molded article having a photocatalytic function according to claim 27, wherein said ultraviolet radiating material comprises a material that emits light by releasing energy obtained from outside.

30. A molded article having a photocatalytic function according to claim 27, wherein said ultraviolet radiating material comprises particles obtained by mixing a material that emits light by consuming an internal energy thereof into one of glass and polymeric organic resin.

31. A molded article having a photocatalytic function according to claim 27, wherein said ultraviolet radiating material comprises particles obtained by mixing a material that emits light by releasing energy obtained from outside into one of glass and polymeric organic resin.

32. A molded article having a photocatalytic function according to claim 27, wherein said molded article includes a hole for inserting therethrough an ultraviolet radiating device for emitting light by receiving energy from outside.

33. A molded article having a photocatalytic function according to claim 32, wherein a photocatalytic function-assisting additive of metal is added to said molded article.

34. A molded article having a photocatalytic function according to claim 27, wherein a photocatalytic function-assisting additive of metal is added to said molded article.

* * * * *